United States Patent Office 2,839,525
Patented June 17, 1958

2,839,525

3-AMINORIBOSE AND METHOD FOR ITS PREPARATION

Peter W. Fryth, New York, and Coy W. Waller, Nanuet, N. Y., assignors to American Cyanamid Company, New York, N. Y., a corporation of Maine No Drawing. Application July 16, 1953
Serial No. 368,510

9 Claims. (Cl. 260—211)

This invention relates to new aminosugar compounds and to methods for preparing the same. More particularly, this invention relates to 3-aminoaldepentoses, and simple derivatives of said 3-aminoaldepentoses.

The new 3-aminoaldepentoses of this invention can be represented by the following structural formula:

$$CHO—CHOH—CHNH_2—CHOH—CH_2OH$$

(Formula I)

From this formula it will be seen that the new 3-aminoaldepentoses of this invention differ from the common aldopentoses such as ribose by having an amino group in the 3 position in place of the usual hydroxy group. They have been found to enter many of the usual reactions of the common aldopentoses. As with the common aldopentoses, the new aminosugars form glycosides when heated in an alcoholic solution of hydrogen chloride. For example, by heating the new aminosugars in an ethanolic solution of hydrogen chloride, the ethyl glycosides can be prepared or by heating in a methanolic solution of hydrogen chloride, the methyl glycosides can be prepared. The new aminopentoses can also be caused to undergo inversion and epimeric changes by methods analogous to those employed with the common aldopentoses so that other geometric configurations are readily obtained.

Since the new sugars of this invention contain a free amino group, they are basic substances and readily form addition salts with acids. For example the new amino sugars form addition salts with mineral acids as illustrated by hydrochloric acid, sulfuric acid, and with organic acids as illustrated by acetic acid. The acid addition salts are a valuable form of the new sugars, particularly in isolation and purification procedures, and it is intended that they also constitute a part of the present invention.

The free amino group possessed by the new sugars of this invention can also be acylated in a manner typical of primary amino groups. For example, the amino group can be acylated with acetic anhydride or acetyl chloride to form the acetyl derivative. In a like manner other N-acyl derivatives as illustrated by the N-propionyl and N-benzoyl derivatives are readily prepared by the use of the appropriate acylating agent in place of acetyl chloride. These acyl derivatives are also valuable and it is likewise intended that they constitute a part of the present invention.

As with other aldopentoses, it is probable that the new sugars of this invention at times exist at least partially in an isomeric furanose or pyranose form. When in the furanose form, the free base can be represented by the following structural formula:

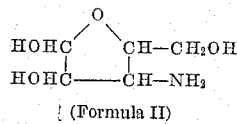

(Formula II)

and when in the pyranose form the new compounds can be represented by the following structural formula:

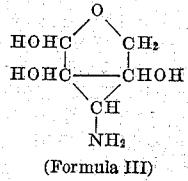

(Formula III)

Since a state of isomeric equilibrim cannot be shown by a single structural formula, it is intended that Formula I above represent the new compounds of this invention, regardless of the fact that they might at times exist at least partially in an isomeric form.

The new compounds of this invention are valuable intermediates in organic synthesis and can, for example, be employed in the synthesis of aminonucleosides active against trypanosomiasis. Such a process can comprise transforming the free aminopentose to the corresponding 1,2,3-triacetyl-5-trityl aminopentose by the method of Bredereck (Ber. 1940, 73, 956), and transforming the 1,2,3-triacetyl derivative to the corresponding acetohalogenofuranose by the method of Howard et al. (J. Chem. Soc., 1947, p. 1052). The acetohalogenofuranose compound is then reacted with a 2-alkylmercaptopurine salt prepared by the reaction of a 2-alkylmercaptopurine, of the type disclosed in copending U. S. application, Serial No. 317,582, filed October 28, 1952 by Baker and Joseph, with mercuric chloride in the presence of a base. The blocking acyl groups can then be removed by hydrolysis to give the free aminonucleoside.

The new compounds of this invention also have other utility and can, for example, be employed as sugar substitutes, mild reducing agents, intermediates for the preparation of furfural, and as weak bases for pH adjustments.

It has been found that the new compounds of this invention can readily be prepared from puromycin (Antibiotics and Chemotherapy, 2, 409) by a process which comprises acid hydrolysis and it is intended that this new process also constitute a part of the present invention. According to this new process, an acid addition salt of the aminopentose is obtained by the acid hydrolysis of puromycin or salt thereof, with a strong mineral acid. The free base can then be prepared by neutralizaiton. The N-acetyl derivatives can be prepared from the free base or an acid addition salt by acylation with acetic anhydride or other suitable acylating agents.

The hydrolysis of puromycin for the preparation of aminopentose base is preferably carried out in acidic alcoholic solution. Suitable solvents for performing the hydrolysis can be illustrated by ethyl alcohol, methyl alcohol, or other aliphatic alcohols of this type. The hydrolysis can also be carried out in acidic aqueous solution, although isolation of the product is sometimes more difficult. Suitable acids for use in the new process can be illustrated by hydrochloric acid, sulfuric acid or other non-oxidizing mineral acids. The hydrolysis is preferably performed at the reflux temperature of the reaction mixture, although lower temperatures, as for example 50° C., can be employed if desired. Likewise, higher temperatures and pressures can be employed to shorten the reaction period in some instances. When employing methyl or ethyl alcohol and hydrochloric acid, the reaction is substantially complete in about six hours, although longer reaction periods are ordinarily employed to insure complete hydrolysis. For instance, a reaction period of approximately twenty hours has been found to be quite satisfactory.

3

The invention will be illustrated by the following specific examples in which all parts are by weight unless otherwise indicated:

Example I

A solution of 40 parts of puromycin hydrochloride in 1200 parts by volume of ethanol was saturated with hydrogen chloride and refluxed for two hours. At the end of this time, a precipitate had formed and was removed by filtration. The resulting filtrate was then refluxed for twenty-nine hours, concentrated to approximately $\frac{1}{10}$ of the original volume and diluted with 500 parts by volume of 50% ethanol. This solution was allowed to stand for an additional three hours and was then concentrated to a syrupy residue. This residue was crystallized from ethanol to obtain white crystals of 3-amino-D-ribose hydrochloride having a melting point of about 170°–174° C. with decomposition. The purified product had a rotation of $[\alpha]_D^{25}$ —24.6° (4% in water).

Example II

The procedure of Example I was repeated, except that methanol was employed as a solvent in place of the ethanol of Example I. The yield of 3-aminopentose was approximately the same.

Example III

A solution of 500 parts of the 3-aminopentose hydrochloride in 75 parts by volume of 1% hydrogen chloride in methanol was refluxed for approximately 10 hours. The solution was then evaporated to dryness and the residue recrystallized from a methanol-ether mixture. The resulting crystals of the methyl glycoside of the 3-aminopentose hydrochloride melted at about 161–163° C. with decomposition.

Example IV

A mixture of 1 part by weight of 3-aminopentose hydrochloride, 0.5 parts by weight of sodium acetate, 1 part by volume of acetic anhydride and 25 parts by volume of water was shaken for approximately 15 minutes at room temperature. The resulting solution was evaporated to dryness and the resulting residue extracted with isopropanol. This residue was then recrystallized from an ethanol-ether mixture to give white crystals of 3-acetamino-D-ribose having a melting point of about 74–76° C.

Example V 250 mg. of 3-aminoribose were dissolved in 20 cc. of dilute sodium hydroxide and to this solution there was added 1.5 cc. of benzoyl chloride and the mixture shaken for thirty minutes. Upon standing an oily layer separated. The clear supernatant was decanted and the oily residue dried azeotropically with benzene. The product was purified by crystallization from chloroform/petroleum ether, to give crystals of N-benzoyl-3-amino-D-ribose melting at about 75° C.

We claim:

1. Compounds selected from group consisting of the 3-aminoribose of the formula:

$$CHO—CHOH—CHNH_2—CHOH—CH_2OH$$

acid addition salts, glycosides and N-lower alkanoyl and N-benzoyl derivatives thereof.

2. The new compound 3-amino-D-ribose.
3. The new compound 3-amino-D-ribose hydrochloride.
4. The new compound 3-acetamino-D-ribose.
5. The new compound N-benzoyl-3-amino-D-ribose.
6. A process of preparing 3-amino-D-ribose which comprises hydrolyzing puromycin-hydrochloride in a saturated alcoholic solution of hydrogen chloride.
7. A method which comprises hydrolyzing in a strongly acidic solution a compound selected from the group consisting of puromycin and acid addition salts of puromycin.
8. A method which comprises hydrolyzing in a strongly acidic solution a compound selected from the group consisting of puromycin and acid salts of puromycin, and then neutralizing the resulting product.
9. A method which comprises hydrolyzing in a strongly acidic solution a compound selected from the group consisting of puromycin and addition salts of puromycin, neutralizing the resulting product and reacting the free base so obtained with an acid anhydride.

References Cited in the file of this patent

James et al., Nature, vol. 156, pages 308–9, Sept. 8, 1945.

Waller, Fryth, Hutchings, and Williams, J. Amer. Chem. Soc., vol. 75 (April 20, 1953) page 2025.